United States Patent
Koo

(10) Patent No.: US 7,701,701 B2
(45) Date of Patent: Apr. 20, 2010

(54) COMPUTER SYSTEM AND CONTROL METHOD THEREOF

(75) Inventor: Ja-goun Koo, Seoul (KR)

(73) Assignee: Samsung Electronics, Co., Ltd., Suwon-si (KR)

(*) Notice: Subject to any disclaimer, the term of this patent is extended or adjusted under 35 U.S.C. 154(b) by 369 days.

(21) Appl. No.: 11/653,973

(22) Filed: Jan. 17, 2007

(65) Prior Publication Data

US 2007/0192513 A1    Aug. 16, 2007

(30) Foreign Application Priority Data

Feb. 16, 2006   (KR)   ............... 10-2006-0015093

(51) Int. Cl.
*G06F 1/16* (2006.01)
(52) U.S. Cl. .............. 361/679.33; 713/340; 320/134; 710/303; 365/232
(58) Field of Classification Search ......... 713/300–340; 320/12, 134; 710/1, 303; 365/232; 361/679.33–679.42, 361/679.46

See application file for complete search history.

(56) References Cited

U.S. PATENT DOCUMENTS

| 6,018,229 | A | * | 1/2000 | Mitchell et al. ............. 320/112 |
| 6,038,670 | A | * | 3/2000 | Oh ............................. 713/300 |
| 6,385,667 | B1 | | 5/2002 | Estakhri et al. |
| 6,636,912 | B2 | | 10/2003 | Ajanovic et al. |
| 2007/0192513 | A1 | * | 8/2007 | Koo ............................. 710/1 |

FOREIGN PATENT DOCUMENTS

| JP | 2002-288022 | 10/2002 |
| KR | 2004-21043 | 3/2004 |
| KR | 2004-41076 | 5/2004 |

OTHER PUBLICATIONS

Office Action issued on Mar. 29, 2007 by the Korean Intellectual Property Office for Korean Patent Application No. 2002-288022.
Office Action issued by the Chinese Patent Office in Chinese Patent Application No. 2007100057917 on Jul. 3, 2009.

* cited by examiner

*Primary Examiner*—Hung V Duong
(74) *Attorney, Agent, or Firm*—Jefferson IP Law, LLP

(57) ABSTRACT

A computer system has an internal mounting unit in which a device supporting a predetermined interface is mounted. The computer system includes an external mounting unit supporting the interface; a device controller comprising a plurality of communication channels, which can communicate with the device, for communicating with the device mounted in the internal mounting unit through a first communication channel of the plurality of communication channels and communicating with an external apparatus mounted in the external mounting unit through a second communication channel of the plurality of communication channels; and a switching controller for selectively connecting the external apparatus mounted in the external mounting unit to one of the second communication channel of the device controller and the device mounted in the internal mounting unit according to power-on/off of the system.

33 Claims, 7 Drawing Sheets

COMPUTER SYSTEM AND CONTROL METHOD THEREOF

CROSS-REFERENCE TO RELATED APPLICATIONS

This application claims the benefit of Korean Patent Application No. 2006-15093, filed on Feb. 16, 2006 in the Korean Intellectual Property Office, the disclosure of which is incorporated herein by reference.

BACKGROUND OF THE INVENTION

1. Field of the Invention

Aspects of the present invention relate to a computer system and a control method, and more particularly to a computer system with high use efficiency for a large number of usable devices without restriction on the size of the computer system.

2. Description of the Related Art

At present, computer systems have made rapid progress in their performance owing to higher speed CPUs and higher speed buses such as PCI-Express, USB2.0, IEEE 1394, etc. However, PATA (Parallel Advanced Technology Attachment), which is fixed at a maximum of 133 MB/s, is an obstacle to further development of computer system performance. In recent years, SATA (Serial Advanced Technology Attachment) has been proposed to overcome this obstacle. SATA operates at a maximum of 1.5 Gbps, and further, SATA-II may operate at a maximum of 3.0 Gbps. Also, since SATA (or SATA-II) performs communication via a communication cable using fewer signal pins than PATA, it has merit in that a mounting connector for mounting devices supporting SATA is very small and occupies less space on a board, as compared to PATA.

By virtue of this merit, SATA HDDs (hard disk drives) are rapidly being popularized as SATA devices supporting SATA. Control of a conventional computer system including a SATA HDD as representative devices mounted inside the computer system will be hereinafter described in brief with reference to FIG. 1. As shown in FIG. 1, the conventional computer system includes an ICH (input/output control hub) 1 for interconnecting input signals among various peripheral devices in the computer system and a mounting connector 2 for mounting a SATA HDD 3 supporting a SATA interface standard in such a manner that the SATA HDD 3 may communicate with the ICH 1. Then, when the computer system is powered on, the ICH 1 can communicate with and control the SATA HDD 3 mounted in the mounting connector 2.

With the growing numbers of SATA devices supporting SATA, the ICH 1 shows a tendency to include a plurality of communication channels CH1, CH2, and CH3, which may communicate with the SATA devices, as shown in FIG. 1. Thus, when it is designed for one (for example, CH1) among the plurality of communication channels of the ICH 1 to be connected to the mounting connector 2, the ICH 1 can communicate with the SATA HDD 3 mounted in the mounting connector 2 via a TX port and an RX port of the communication channel CH1.

However, an internal device, such as the SATA HDD 3, mounted on a board of the computer system through the mounting connector 2 provided inside the computer system cannot operate since the internal device is not supplied with power when the computer system is powered off. That is, when the computer system is powered off, there is no way for other external computer systems to access the internal device (for example, the SATA HDD 3) mounted inside the computer system.

Particularly, a small computer system such as a notebook computer has a very limited size and hence a limitation on the number of devices (e.g., SATA HDD) mountable on an internal board. Therefore, when a computer system is powered off, if the other computer system can access and use a SATA HDD mounted inside the powered-off computer system, it allows the other computer system, which is powered on, to efficiently use the increased number of usable devices without a restriction on the computer system's size.

SUMMARY OF THE INVENTION

Aspects of the present invention provide a computer system with high use efficiency with a large number of usable devices without restrictions on the computer system's size by allowing the computer system to access external devices or allowing to access internal devices mounted inside the computer system from the outside through an external mounting unit provided in the computer system.

According to an aspect of the present invention, there is provided a computer system comprising an internal mounting unit in which a device supporting a predetermined interface is mounted; an external mounting unit supporting the predetermined interface; a device controller comprising a plurality of communication channels, which can communicate with the device mounted in the internal mounting unit, to communicate with the device mounted in the internal mounting unit through a first communication channel of the plurality of communication channels and to communicate with an external apparatus mounted in the external mounting unit through a second communication channel of the plurality of communication channels; and a switching controller to selectively connect the external apparatus mounted in the external mounting unit to one of the second communication channel of the device controller and the device mounted in the internal mounting unit, depending on whether the computer system is powered on or off.

According to another aspect of the present invention, the switching controller comprises: a switching part to selectively connect the external apparatus mounted in the external mounting unit to one of the second communication channel of the device controller and the device mounted in the internal mounting unit; and a controlling part to detect the power-on/off of the computer system and to direct the switching part to connect the external apparatus to the device mounted in the internal mounting unit when the computer system is powered off and to connect the external apparatus to the second communication channel of the device controller when the computer system is powered on.

According to another aspect of the present invention, the controlling part comprises a power supply to supply power when the computer system is powered on, and wherein the switching part connects the external apparatus to the second communication channel of the device controller when the switching part is supplied with power from the controlling part, and connects the external apparatus mounted in the external mounting unit to the device mounted in the internal mounting unit when the switching part is not supplied with the power from the controlling part.

According to another aspect of the present invention, the computer system further comprises a user input part, wherein the controlling part comprises a microcomputer to direct the switching part to connect the external apparatus to the second communication channel of the device controller when the computer system is powered on through the user input part and to direct the switching part to connect the external apparatus to the device mounted in the internal mounting part when the computer system is powered off through the user input part.

According to another aspect of the present invention, the user input part comprises a switching function key to control the switching part; and wherein the microcomputer, according to input from the switching function key of the user input part, directs the switching part to connect the external apparatus mounted in the external mounting unit to one of the second communication channel of the device controller and the device mounted in the internal mounting unit.

According to another aspect of the present invention, the computer system further comprises a CPU controlling the power-on/off of the system, wherein the controlling part directs the switching part to connect the external apparatus to the second communication channel of the device controller when the controlling part receives a system power-on instruction from the CPU and directs the switching part to connect the external apparatus to the device mounted in the internal mounting part when the controlling part receives a system power-off instruction from the CPU.

According to another aspect of the present invention, the computer system further comprises an ICH (input/output control hub) communicating with the CPU, wherein the ICH includes the controlling part.

According to another aspect of the present invention, the interface supports a SATA (Serial Advanced Technology Attachment) standard.

According to another aspect of the present invention, the external apparatus comprises one of an external device supporting the SATA standard and an electronic apparatus equipped with the external device, and wherein both the device mounted in the internal mounting unit and the external device comprises a SATA HDD supporting the SATA standard.

According to another aspect of the present invention, the computer system further comprises an ICH, wherein the ICH includes the device controller.

According to another aspect of the present invention, when the system is powered on, the ICH communicates with at least one of the device mounted in the internal mounting unit and the external apparatus mounted in the external mounting unit through at least one of the first communication channel and the second communication channel.

According to another aspect of the present invention, the computer system further comprises an internal battery to supply driving power to the device mounted in the internal mounting unit when the system is powered off.

According to another aspect of the present invention, the computer system further comprises a power supply to supply circuit parts in the system with respective driving power; and a communication port through which power is supplied from the outside, wherein the power supply supplies the circuit parts in the computer system with the respective driving power when the computer system is powered on and supplies the driving power to the device mounted in the internal mounting unit based on the power supplied through the communication port when the computer system is powered off.

According to another aspect of the present invention, there is provided a control method of a computer system comprising: assigning a first communication channel of a plurality of communication channels of a device controller to a device supporting a predetermined interface mounted in an internal mounting unit assigning a second communication channel of the plurality of communication channels to an external apparatus mounted in an external mounting unit; and selectively connecting the external apparatus mounted in the external mounting unit to one of the second communication channel of the device controller and the device mounted in the internal mounting unit according to power-on/off of the system.

According to another aspect of the present invention, the selectively connecting comprises connecting the external apparatus mounted in the external mounting unit to the second communication channel of the device controller when the computer system is powered on; and connecting the external apparatus mounted in the external mounting unit to the device mounted in the internal mounting unit when the computer system is powered off.

According to the embodiment of the present invention, the predetermined interface supports a SATA standard.

According to the embodiment of the present invention, the external apparatus comprises one of an external device supporting the SATA standard and an electronic apparatus equipped with the external device, and wherein each of the devices mounted in the internal mounting unit and the external device comprises a SATA HDD supporting the SATA standard.

According to the embodiment of the present invention, the control method further comprises providing an ICH, wherein the device controller is included in the ICH.

According to the embodiment of the present invention, the control method further comprises: connecting the ICH to at least one of the device mounted in the internal mounting unit and the external apparatus connected by the switching control through at least one of the first communication channel and the second communication channel when the system is powered on; and connecting the device mounted in the internal mounting unit to the external apparatus connected by the switching control when the system is powered off.

Additional aspects and/or advantages of the invention will be set forth in part in the description which follows and, in part, will be obvious from the description, or may be learned by practice of the invention.

BRIEF DESCRIPTION OF THE DRAWINGS

These above and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
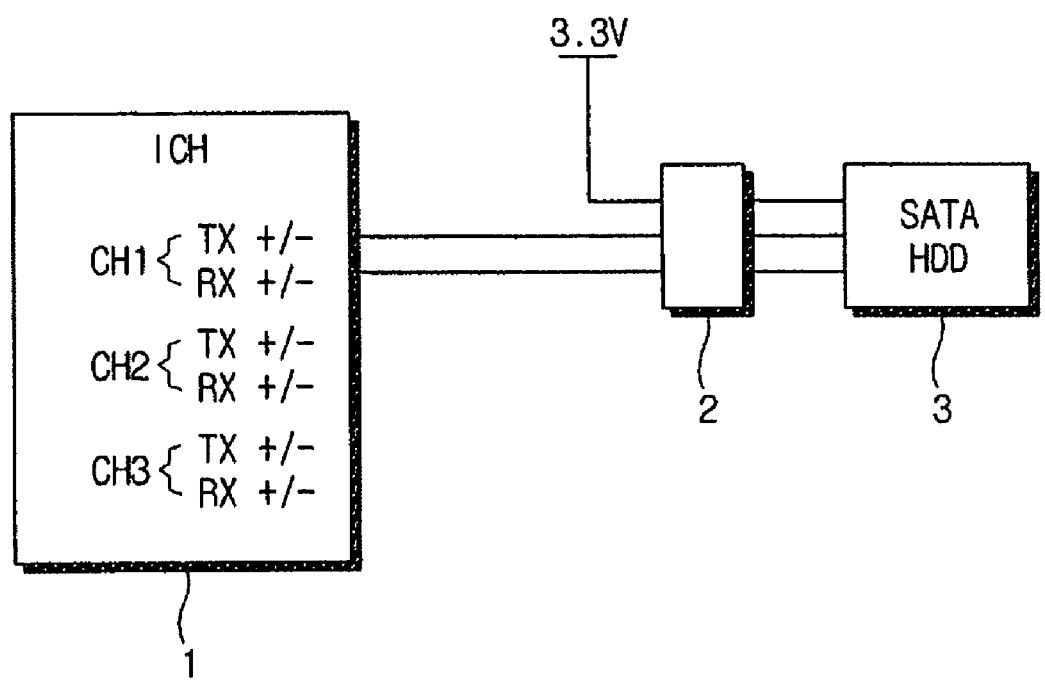
FIG. 1 is a simplified control block diagram of a conventional computer system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
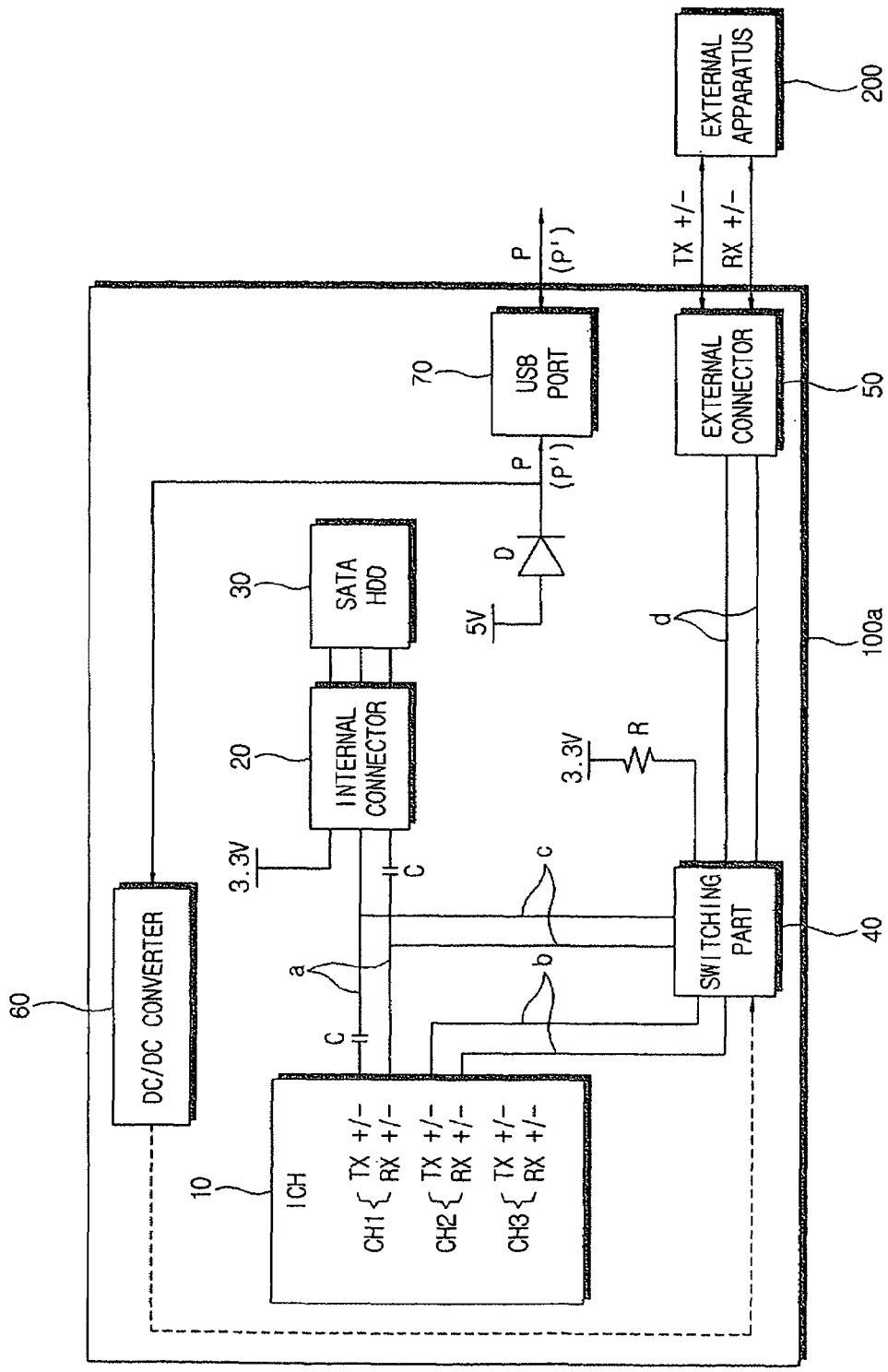
FIG. 2 is a control block diagram of a computer system according to a first embodiment of the present invention.

FIG. 2 is a control block diagram of a computer system according to a first embodiment of the present invention. As shown in FIG. 2, a computer system 100a of the present invention includes an ICH (input/output control hub) 10, an internal connector 20, a SATA HDD 30, a switching part 40, an external connector 50, a DC/DC converter 60, and a USB port 70.

The internal connector 20 is provided as an internal mounting unit for mounting a device supporting a predetermined interface on a board inside the computer system 100a. The internal connector 20 is electrically connected to one of a plurality of communication channels of the ICH 10 via a first communication line 'a' to allow the device mounted on the board to communicate with the ICH 10.

The external connector 50 in which an external apparatus 200 is mounted is provided as an external mounting unit supporting the same interface as the internal connector 20. In this embodiment, the external apparatus 200 may be provided as one of an external device supporting the same interface as the device (for example, the SATA HDD 30) mounted in the internal connector 20 or an electronic apparatus equipped with the external device. According to other aspects of the invention, the external mounting unit 50 and the external apparatus may support another interface.

The external connector 50 is electrically connected to the switching part 40 via a fourth communication line 'd' and is exposed to the outside of the body casing of the computer system 100a.

In the first embodiment, interfaces supported by the internal connector 20 and the external connector 50 may be SATA (Serial Advanced Technology Attachment) standards, and a device mounted in the internal connector 20 may be the SATA HDD 30 representative of a SATA device supporting the SATA standards. Also, the external apparatus 200 may be an external SATA HDD representative of a SATA device or an electronic apparatus equipped with a external SATA HDD. According to other aspects of the present invention, the interfaces may support other devices, such as Firewire (IEEE 1394) devices. Similarly, while the description refers to SATA HDD 30, the device mounted in the internal connector 20 may be any device supporting any standard, such as a digital camera, portable music player, personal digital assistant, or mobile telephone.

The ICH 10 includes a plurality of communication channels CH1, CH2 and CH3, which can communicate with the SATA device, and a device controller for communicating with at least one of the SATA HDD 30 mounted in the internal connector 20 and the external apparatus 200 mounted in the external connector 50, depending upon a switching operation of the switching part 40.

As mentioned above, the ICH 10, as well as including the device controller, also includes a plurality of communication channels CH1, CH2 and CH3 for communicating with the SATA device. A first communication channel CH1 of the plurality of communication channels CH1, CH2 and CH3 of the ICH 10 is connected to the internal connector 20 via the first communication line 'a' to communicate with the SATA HDD 30 mounted in the internal connector 20. Similarly, a second communication channel CH2 of the plurality of communication channels CH1, CH2 and CH3 of the ICH 10 is connected to the switching part 40 via a second communication line 'b' to communicate with the external apparatus 200 mounted in the external connector 50 depending upon the switching operation of the switching part 40.

The ICH 10 is an input/output control hub for interconnecting input signals from various peripheral or other devices, for example, a PCI controller, a USB controller, a LAN controller, a BIOS ROM, an I/O controller, and an IDE controller, etc., in the computer system 100a. The ICH may interconnect signals input from any device.

In addition, the computer system 100a includes a switching controller for connecting the external apparatus 200 mounted in the external connector 50 to the second communication channel CH2 of the ICH 10 or to the SATA HDD 30 mounted in the internal connector 20 via a third communication line 'c' depending on whether the computer system 100a is powered on or off.

The switching controller includes the switching part 40 and, as a controller, the DC/DC converter 60.

The DC/DC converter 60 detects power-on/off of the computer system 100a and functions as a controller to direct the switching part 40 to connect the external apparatus 200 mounted in the external connector 50 to the SATA HDD 30 mounted in the internal connector 20 when the computer system 100a is powered off and to connect the external apparatus 200 mounted in the external connector 50 to the second communication channel CH2 of the ICH 10 when the computer system 100a is powered on. Also, the DC/DC converter 60 supplies circuit parts in the computer system 100a with respective driving power (for example, driving power (3.3V) to the SATA HDD 30, power (3.3V) to the switching part 40, driving power (Vcc) to the ICH 10, etc.) when the computer system 100a is powered on, and stops supplying the circuit parts in the computer system 100a with the respective driving power when the system 100a is powered off. That is, the DC/DC converter 60 functions as a typical power supply.

The switching part 40 selectively connects the external apparatus 200 mounted in the external connector 50 to one of the second communication channel CH2 of the ICH 10 and the SATA HDD 30 mounted in the internal connector 20. Specifically, when the switching part 40 is supplied with power from the DC/DC converter 60, the switching part 40 connects the second communication line 'b' to the fourth communication line 'd' so that the external apparatus 200 mounted in the external connector 50 is electrically connected to the second communication channel CH2 of the ICH 10. When the power from the DC/DC converter 60 is interrupted, i.e., not supplied to the switching part 40, the switching part 40 connects the third communication line 'c', which branches from the first communication line 'a', to the fourth communication line 'd' so that the external apparatus 200 mounted in the external connector 50 can be electrically connected to the SATA HDD 30 mounted in the internal connector 20.

Depending on whether or not the switching part 40 is supplied with power from the DC/DC converter 60, in other words, whether the computer system 100a is powered on or off, the switching part 40 selectively connects the fourth communication line 'd' to one of the second communication line 'b' and the third communication line 'c'. The switching part 40 may perform the connection via a plurality of transistors and other various components. According to other aspects of the invention the switching part may perform the connection using any combination of components.

In addition, the computer system 100a may include a USB port 70 as a communication port through which the computer system 100a may be supplied with power from the outside. Accordingly, the computer system 100a may output power (5V), which is supplied from the DC/DC converter 60, to other external electronic apparatuses connected to the system 100a via the USB port 70 as driving power P when the system 100a is powered on, and may be supplied with the power P' from other external electronic apparatuses connected to the system 100a via the USB port 70 when the system 100a is powered off. According to other aspects of the invention, the communication port shown as USB port 70 may use any interface capable of communicating with and supplying power from the outside, such as Firewire (IEE 1394).

Thus, the DC/DC converter 60 supplies the circuit parts of the computer system 100a with the respective driving power when the computer system 100a is powered on, stops the operation of supplying the circuit parts in the computer system 100a with the respective driving power when the system 100a is powered off, and then supplies the SATA HDD 30 mounted in the internal connector 20 with driving power based on the power P' supplied from other external electronic apparatuses connected to the computer system 100a via the USB port 70.

As described above, when the computer system 100a is powered on, the switching part 40 connects the second communication line 'b' to the fourth communication line 'd', thus allowing the ICH 10 to communicate with at least one of the SATA HDD 30 mounted in the internal connector 20 and an external SATA HDD of the external apparatus 200 connected to the system 100a through the external connector 50. Specifically, the ICH 10 may assign the separate SATA communication channels CH1 and CH2 to the SATA HDD 30 mounted in the internal connector 20 and the external SATA HDD of the external apparatus 200, respectively, and, when the computer system 100a is powered on, the ICH may access and communicate with one or both of the SATA HDD 30 mounted in the internal connector 20 and the external SATA HDD of the external apparatus 200.

On the other hand, when the computer system 100a is powered off, the switching part 40 connects the third communication line 'c' to the fourth communication line 'd', thus allowing the SATA HDD 30 mounted in the internal connector 20 to communicate with the external apparatus 200 connected to the computer system 100a through the external connector 50. Specifically, when the computer system 100a is powered off, the SATA HDD 30 mounted in the internal connector 20 is accessed by the external apparatus 200 connected to the computer system 100a through the external connector 50 without being accessed by the ICH 10, whose operation is stopped. In this case, since the computer system 100a is in the power-off state, the SATA HDD 30 normally communicates with the external apparatus 200 using the driving power supplied from the DC/DC converter 60 based on the power supplied from other external electronic apparatuses connected to the computer system 100a via the USB port 70.

The other external electronic apparatus connected to the computer system 100a via the USB port 70 for supplying the power may be a separate electronic apparatus different from the external apparatus 200, or the external apparatus 200 may be connected to the USB port 70 via a cable other than the communication cable connected to the external connector 50. If the communication port shown as USB port 70 is a USB port, the cable will be a USB cable. If the communication port shown as USB port 70 supports another interface, the cable will be a cable appropriate for the other interface.

Figure 3:
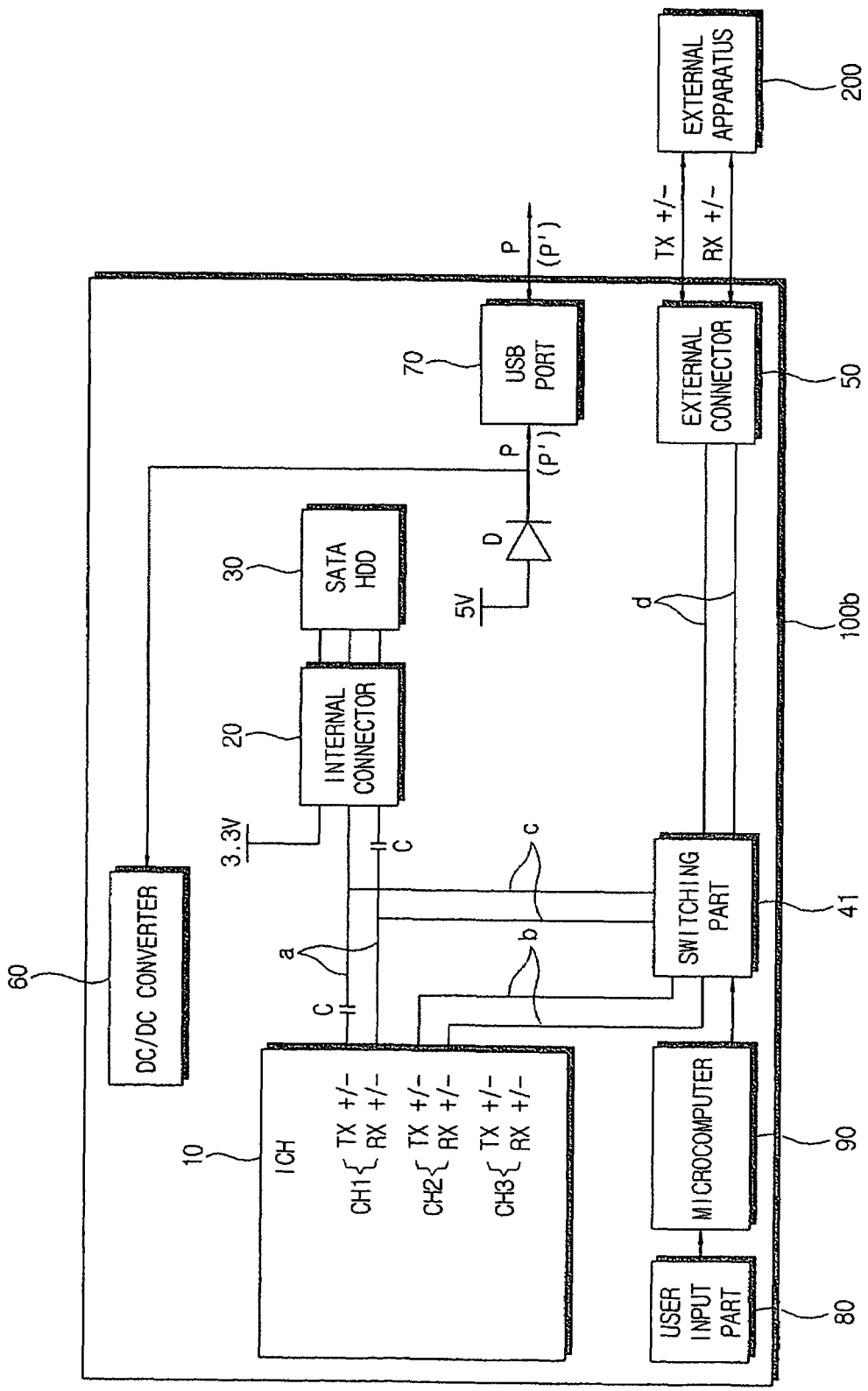
FIG. 3 is a control block diagram of a computer system according to a second embodiment of the present invention.

Hereinafter, a control block diagram of a computer system according to a second embodiment of the present invention will be described with reference to FIG. 3. In this embodiment, the same elements as the computer system 100a according to the first embodiment are denoted by the same reference numerals, and detailed explanation thereof will be omitted for the sake of brevity.

A computer system 100b according to the second embodiment of the present invention includes an ICH 10, an internal connector 20, an SATA HDD 30, a switching part 41, an external connector 50, a DC/DC converter 60, a USB port 70, a user input part 80, and a microcomputer 90.

As an input unit through which a user can input instructions, the user input part 80 may be provided as an input device, such as a mouse (not shown) or a keyboard (not shown), connected to the body of the computer system 100b, or a wireless remote controller. Any input device can be used, so long as the input device can select power on/off of the computer system 100b in various ways such as including on/off keys for selection of power-on/off of the computer system 100b or selecting power-on/off of the system by an OS (operating system). According to other aspects of the invention, other devices, such as trackpads or microphones, can be used.

In addition, the computer system 100b of the present invention includes a switching controller to connect the external apparatus 200 mounted in the external connector 50 to one of the second communication channel CH2 of the ICH 10 and the SATA HDD 30 mounted in the internal connector 20, depending on whether the computer system 100b is powered on or off.

The switching controller includes the switching part 41 and the microcomputer 90.

The microcomputer 90 detects power-on/off of the computer system 100b. The microcomputer 90 outputs a first control signal directing the switching part 41 to connect the external apparatus 200 mounted in the external connector 50 to the second communication channel CH2 of the ICH 10 when the computer system 100b is powered on through the user input part 80. The microcomputer 90 outputs a second control signal directing the switching part 41 to connect the external apparatus 200 mounted in the external connector 50 to the SATA HDD 30 mounted in the internal connector 20 when the computer system 100b is powered off by the user input part 80.

The switching part 41 selectively connects the external apparatus 200 mounted in the external connector 50 to one of the second communication channel CH2 of the ICH 10 and the SATA HDD 30 mounted in the internal connector 20. Specifically, when the switching part 41 receives the first control signal from the microcomputer 90, the switching part 41 connects the second communication line 'b' to the fourth communication line 'd' so that the external apparatus 200 mounted in the external connector 50 is electrically connected to the second communication channel CH2 of the ICH 10. When the switching part 41 receives the second control signal from the microcomputer 90, the switching part 41 connects the third communication line 'c', which branches from the first communication line 'a', to the fourth communication line 'd' so that the external apparatus 200 mounted in the external connector 50 is electrically connected to the SATA HDD 30 mounted in the internal connector 20.

The switching part 41 may include a plurality of transistors and other various circuit components to selectively connect the fourth communication line 'd' to one of the second communication line 'b' and the third communication line 'c' according to the control signals from the microcomputer 90. According to other aspects of the present invention, the switching part may include any combination of components to accomplish the selective connection.

As described above, when the computer system 100b according to the second embodiment of the present invention is powered on, the switching part 41 connects the second communication line 'b' to the fourth communication line 'd', thus allowing the ICH 10 to communicate with at least one of the SATA HDD 30 mounted in the internal connector 20 and an external SATA HDD of the external apparatus 200 connected to the system 100b through the external connector 50.

On the other hand, when the computer system 100b of the present invention is powered off, the switching part 41 connects the third communication line 'c' to the fourth communication line 'd', thus allowing the SATA HDD 30 mounted in the internal connector 20 to communicate with the external apparatus 200 connected to the system 100b through the external connector 50.

The user input part 80 may further include a switching function key used to control a switching operation of the switching part 41, regardless of whether the computer system 100b is powered on or powered off. The user input part may also employ other ways to control operation of the switching part 41, such as a voice command or recognition of a voice command.

The microcomputer 90 can control the switching part 41 to selectively connect the external apparatus 200 mounted in the external connector 50 to one of the second communication channel CH2 of the ICH 10 and the SATA HDD 30 mounted in the internal connector 20 according to input from the switching function key of the user input part 80 irrespective of power-on/off of the computer system 100b. According to other aspects of the invention, the input may be any kind of input, such as a voice command or a combination of keys or keystrokes.

By controlling the switching part 41 depending on a selection by the user irrespective of whether the computer system 100b is powered on or powered off, the computer system 100b can access the external SATA HDD of the external apparatus 200 through the external connector 50 or allow the external apparatus 200 to access the internal SATA HDD 30 of the computer system 100b.

When the input from the switching function key of the user through the user input part 80 allows the SATA HDD 30 of the computer system 100b to be accessed by the external apparatus 200, since the computer system 100b is not in the power-off state, the driving power to the SATA HDD 30 may be supplied from the typical DC/DC converter 60 in the power-on state of the computer system 100b without using power supplied via the USB port 70. Other aspects of the present invention may supply power to the SATA HDD 30 from other sources.

Figure 4:
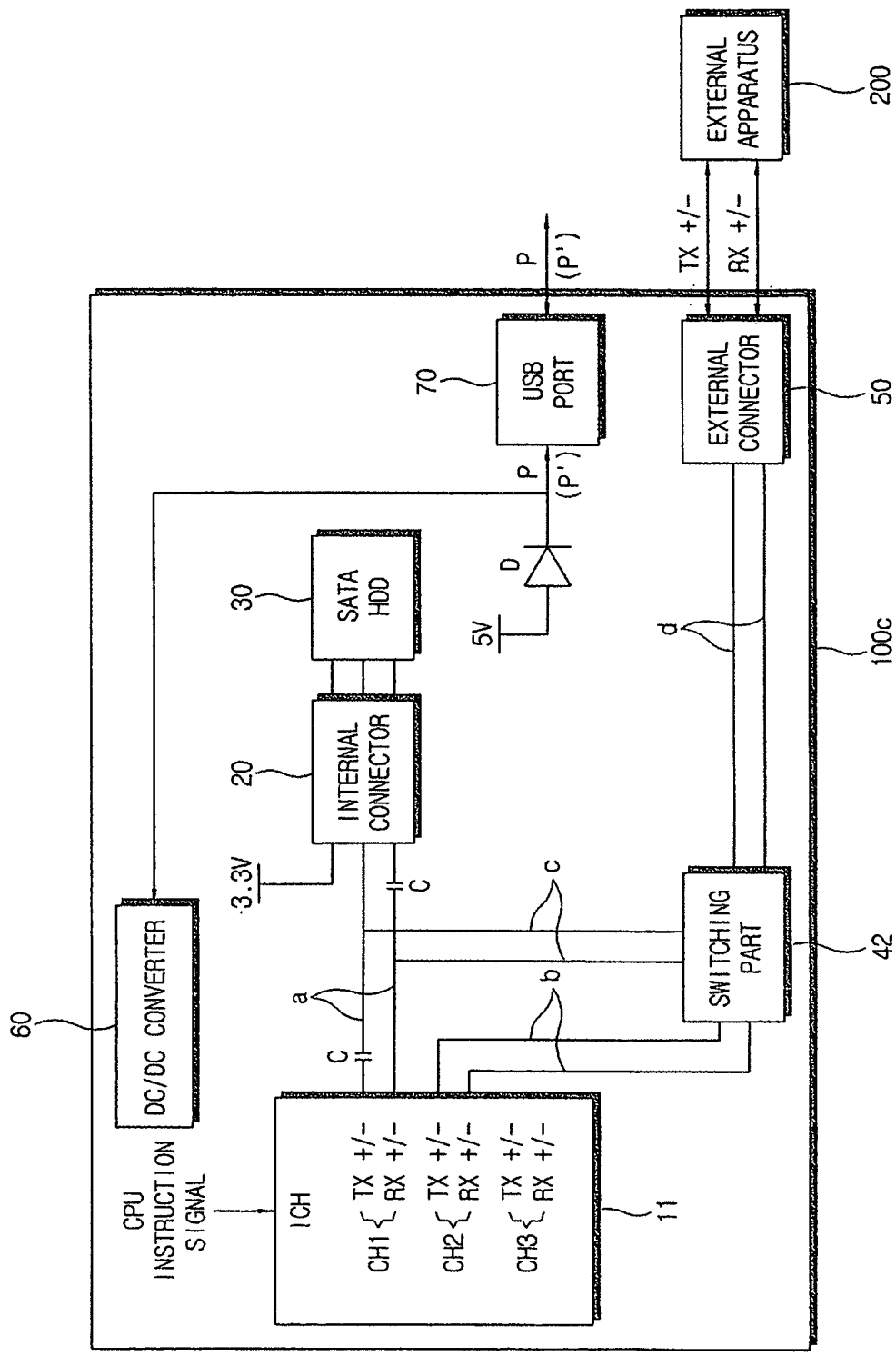
FIG. 4 is a control block diagram of a computer system according to a third embodiment of the present invention.

A control block diagram of a computer system according to a third embodiment of the present invention will be described with reference to FIG. 4. In this embodiment, the same elements as the computer system 100a according to the first embodiment are denoted by the same reference numerals, and detailed explanation thereof will be omitted for the sake of brevity.

A computer system 100c according to the third embodiment of the present invention includes an ICH 11, an internal connector 20, an SATA HDD 30, a switching part 42, an external connector 50, a DC/DC converter 60, and a USB port 70.

Like the ICH 10 in the first and second embodiments, the ICH 11 includes a plurality of communication channels CH1, CH2 and CH3, which can communicate with the SATA device, and a device controller for communicating with at least one of the SATA HDD 30 mounted in the internal connector 20 and the external apparatus 200 mounted in the external connector 50 according to a switching operation of the switching part 42.

The ICH 11 is an input/output control hub for interconnecting signals input from various peripheral and other devices, for example, a PCI controller, a USB controller, a LAN controller, a BIOS ROM, an I/O controller, an IDE controller, etc., in the computer system 100c. The ICH 11 may also interconnect signals input from any device.

In addition, the computer system 100c includes a switching controller for connecting the external apparatus 200 mounted in the external connector 50 to one of the second communication channel CH2 of the ICH 11 and the SATA HDD 30 mounted in the internal connector 20, depending on whether the computer system 100c is powered on or off.

The switching controller may include the switching part 42 and a controlling part included in the ICH 11. In this case, the controlling part may be controlled by a program that controls and switches the switching part 42 according to system power-on/off instructions from a CPU (not shown) for controlling the computer system 100c and instructing power-on/off of the system 100c. Other aspects of the present invention may employ other techniques to control the controlling part.

The ICH 11 detects power-on/off of the computer system 100c and includes a function as a controller for controlling the switching part 42. The ICH 11 outputs a third control signal directing the switching part 42 to connect the external apparatus 200 mounted in the external connector 50 to the second communication channel CH2 of the ICH 11 when the system 100c is powered on according to a system power-on instruction from the CPU, and outputs a fourth control signal directing the switching part 42 to connect the external apparatus 200 mounted in the external connector 50 to the SATA HDD 30 mounted in the internal connector 20 when the computer system 100c is powered off (according to a system power-off instruction from the CPU.)

The switching part 42 selectively connects the external apparatus 200 mounted in the external connector 50 to one of the second communication channel CH2 of the ICH 11 and the SATA HDD 30 mounted in the internal connector 20. Specifically, when the switching part 42 receives the third control signal from the ICH 11, the switching part 42 connects the second communication line 'b' to the fourth communication line 'd' so that the external apparatus 200 mounted in the external connector 50 is electrically connected to the second communication channel CH2 of the ICH 11. When the switching part 42 receives the fourth control signal from the ICH 11, the switching part 42 connects the third communication line 'c', which branches from the first communication line 'a', to the fourth communication line 'd' so that the external apparatus 200 mounted in the external connector 50 is electrically connected to the SATA HDD 30 mounted in the internal connector 20.

The switching part 42 may include a plurality of transistors and other various circuit components to selectively connect the fourth communication line 'd' to one of the second communication line 'b' and the third communication line 'c' according to the control signals from the ICH 11. According to other aspects of the present invention, the switching part 42 performs the selective connection using any combination of components.

While the computer system 100c is powered off, power is supplied to SATA HDD 30 from a source such as USB port 70, or other communications port, as in the first embodiment.

As described above, when the computer system 100c according to the third embodiment of the present invention is powered on, the switching part 42 connects the second communication line 'b' and the fourth communication line 'd', thus allowing the ICH 11 to communicate with at least one of the SATA HDD 30 mounted in the internal connector 20 and an external SATA HDD of the external apparatus 200 connected to the computer system 100c through the external connector 50.

On the other hand, when the computer system 100c is powered off, the switching part 42 connects the third communication line 'c' to the fourth communication line 'd', thus allowing the SATA HDD 30 mounted in the internal connector 20 to communicate with the external apparatus 200 connected to the computer system 100c through the external connector 50.

Figure 5:
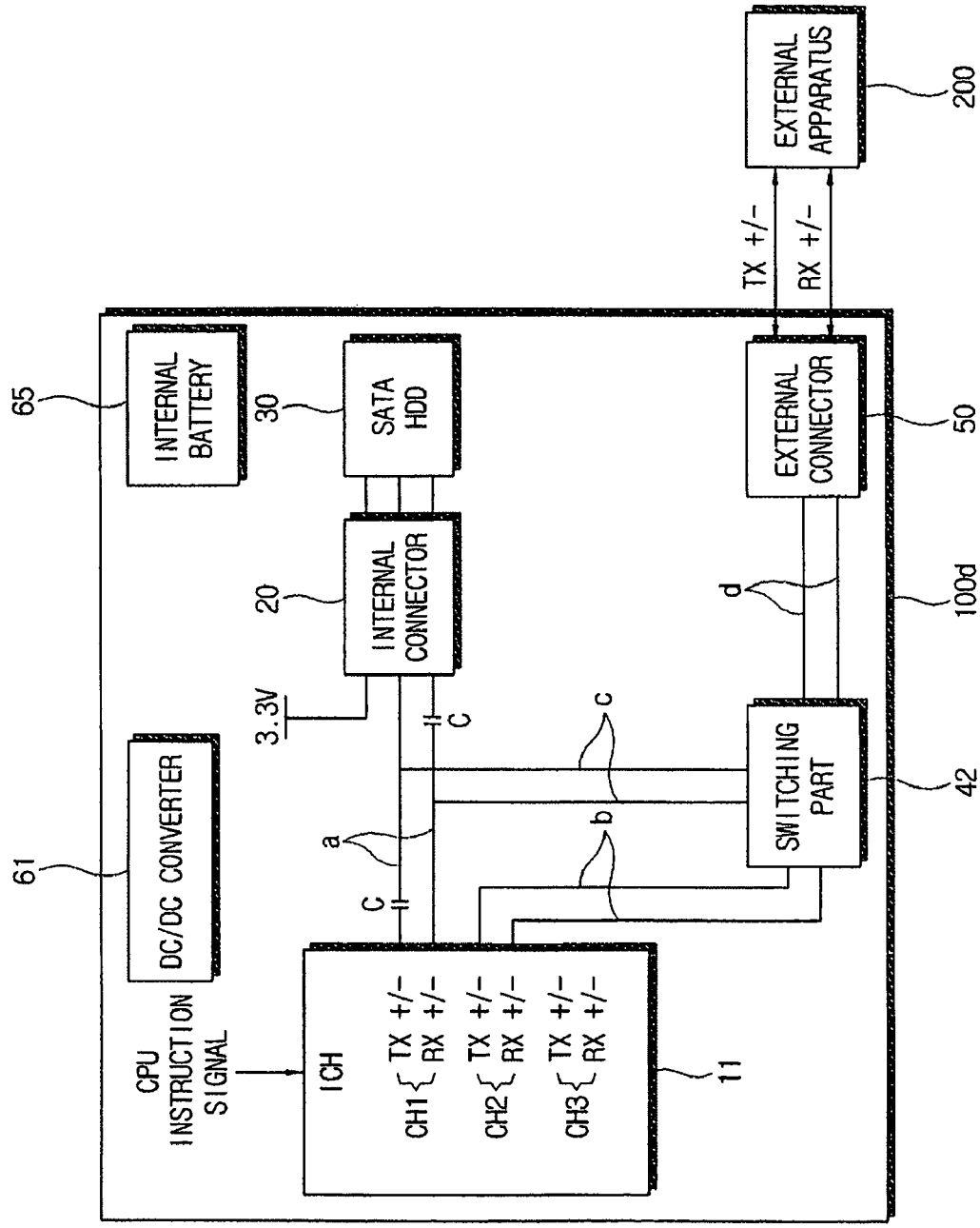
FIG. 5 is a control block diagram of a computer system according to a fourth embodiment of the present invention.

A control block diagram of a computer system according to a fourth embodiment of the present invention will be described with reference to FIG. 5 showing that driving power is supplied to the SATA HDD 30 when the computer system is powered off. For the sake of explanation, this embodiment will be described based on the configuration of the third embodiment illustrated in FIG. 4.

As shown in FIG. 5, the computer system 100d according to the fourth embodiment of the present invention includes an ICH 11, an internal connector 20, an SATA HDD 30, a switching part 42, an external connector 50, a DC/DC converter 61, and an internal battery 65. In this embodiment, the same elements as the third embodiment illustrated in FIG. 4 are denoted by the same reference numerals, and detailed explanation thereof will be omitted for the sake of brevity.

When the computer system 100d is powered on, the DC/DC converter 61 supplies circuit parts in the computer system 100d with respective driving power, and stops supplying the circuit parts (such as the SATA HDD 30) in the computer system 100d with the respective driving power when the computer system 100d is powered off.

That is, the DC/DC converter 61 stops supplying driving power to the SATA HDD 30 in the computer system 100d and to each circuit part respectively.

The internal battery 65 provided inside the computer system 100d may be charged when the system 100d is powered on. The internal battery 65 supplies the required driving power to the SATA HDD 30 mounted in the internal connector 20 when the computer system 100d is powered off.

Accordingly, when the computer system 100d is powered on, the SATA HDD 30 uses the driving power supplied from the DC/DC converter 61 to communicate with the ICH 11. When the computer system 100d is powered off, the SATA HDD 30 uses the driving power supplied from the internal battery 65 to communicate with the external apparatus 200 connected to the system 100d through the external connector 50.

Figure 6:
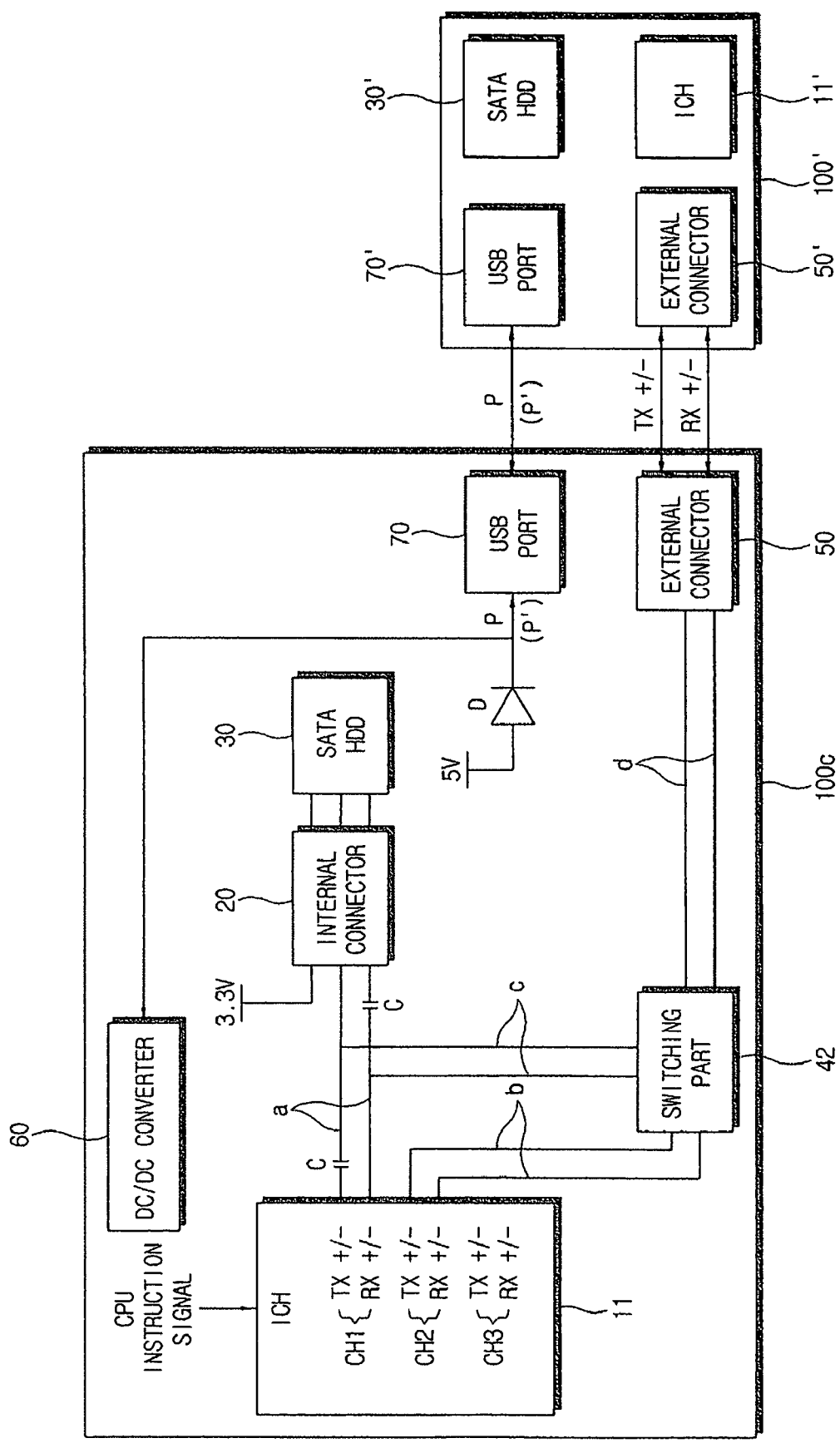
FIG. 6 is a control block diagram of a computer system according to a fifth embodiment of the present invention.

As shown in FIG. 6 as a fifth embodiment of the present invention, the external apparatus 200 connected to the system 100c through the external connector 50 may be another computer system 100' having the same configuration as the computer system 100c. In other words, a computer system of the present invention and another computer system of the present invention may be connected by the external connectors thereof.

Specifically, an external connector 50' of another computer system 100' according to the third embodiment of the present invention may be connected to the external connector 50 of the computer system 100c, also according to the third embodiment of the present invention. In this case, when the computer system 100c is powered on and the computer system 100' is powered off, the computer system 100c may access and use a SATA HDD 30' mounted inside the computer system 100'. On the other hand, when the computer system 100c is powered off and the computer system 100' is powered on, the computer system 100' may access and use the SATA HDD 30 mounted inside the computer system 100c.

Although the fifth embodiment, as shown in FIG. 6, is illustrated with the computer system 100c according to the third embodiment, this is provided only as an example. As alternatives, each of the computer systems 100a, 100b, and 100d according to the first, second and fourth embodiments, respectively, may be provided as the external apparatus 200 to be connected to the external connector 50 in each of these embodiments. According to other aspects of the invention, external apparatus 200 may be any computer system.

Figure 7:
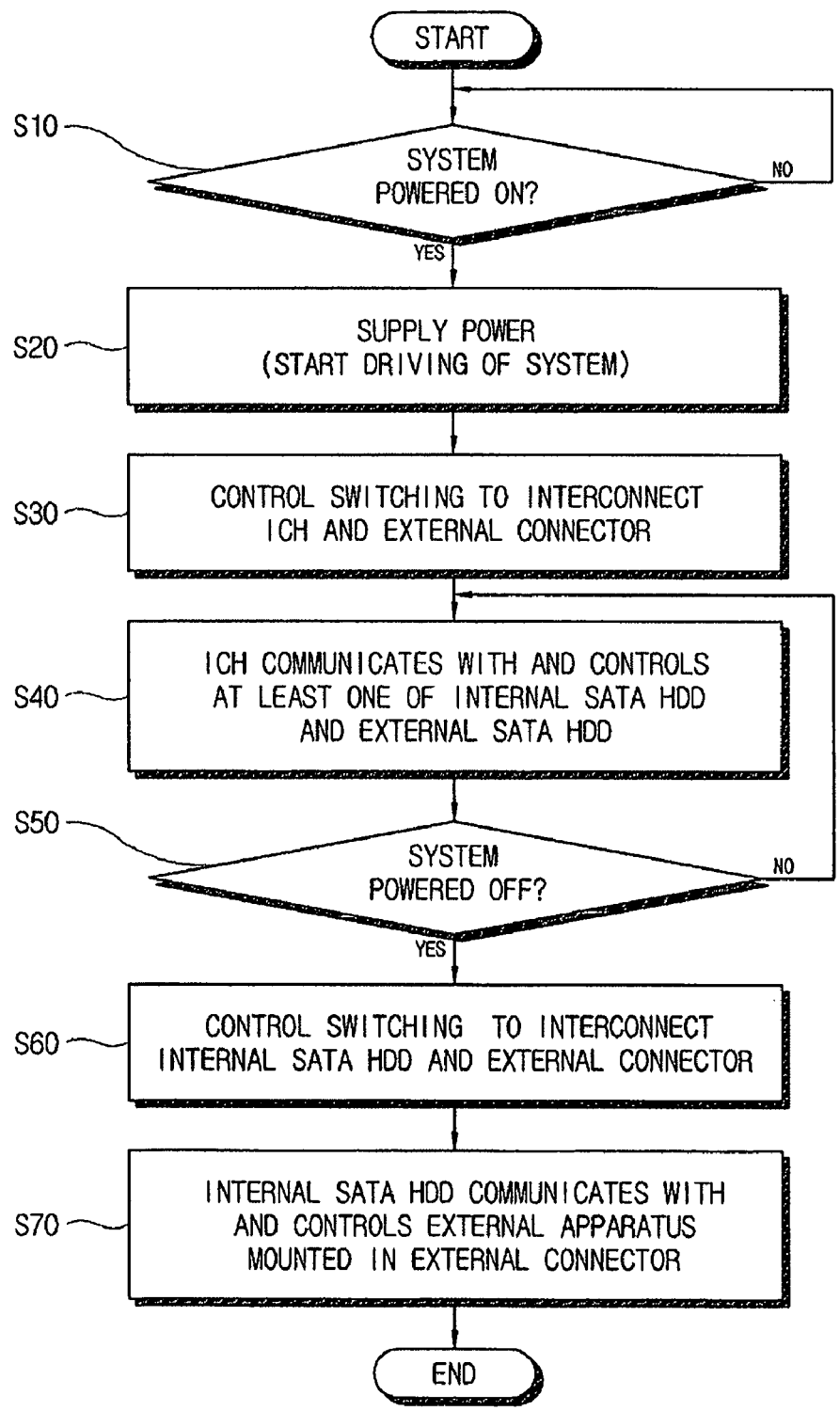
FIG. 7 is a control flow chart of a computer system according to one of the above embodiments of the present invention.

A control flow chart of a computer system according to one of the above embodiments of the present invention will be described with reference to FIG. 7. For the sake of convenience, the control flow chart will be described with respect to computer system 100c according to the third embodiment shown in FIG. 4. However, the method shown in FIG. 7 may be used with any embodiment of the invention, such as computer systems 100a, 100b, and 100d.

First, the external connector 50 is prepared as an external mounting unit supporting a SATA standard in the computer system. Other aspects of the present invention may use other standards. Then, the ICH including the plurality of communication channels, which can communicate with the SATA device, assigns the first communication channel CH1 of the plurality of communication channels to the SATA device (SATA HDD 30) mounted inside the computer system and assigns the second communication channel CH2 of the plurality of communication channels to the external apparatus mounted in the external connector 50.

Then, the computer system determines whether or not the system is powered on at operation S10. Typically, a user selects the power-on/off of the computer system. That is, the user selects the power-off when he wishes to turn off the computer system and selects the power-on when he wishes to turn on the computer system.

When the system is powered on, the DC/DC converter 60, as a power supply apparatus, supplies the circuit parts in the system with respective driving power to start the system at operation S20. Next, at operation S30, according to the system power-on instruction from the CPU, the ICH 11 directs the switching part 42 to connect the second communication line 'b' to the fourth communication line 'd' so that the second communication channel CH2 of the ICH 11 can be connected to the external connector 50. Thus, at operation S40, the ICH 11 can access, communicate with, and control at least one of the SATA HDD 30 mounted inside the computer system and the external SATA HDD of the external apparatus 200 connected to the system through the external connector 50.

Next, the computer system determines whether or not the system is powered off at operation S50. If the system is powered on, then operation S40 repeats, and ICH 11 continues to access, communicate with, and control at least one of the SATA HDD 30 and the external apparatus 200. If the system is powered off, according to the system power-off instruction from the CPU, then at operation S60 the ICH 11 directs the switching part 42 to connect the third communication line c and the fourth communication line d so that the SATA HDD 30 mounted inside the computer system is connected to the external connector 50. Thus, the SATA HDD 30 mounted inside the computer system can be accessed by, communicate with, and be controlled by the external apparatus 200 connected to the system through the external connector 50 at operation S70.

As described above, in the computer system and the control method thereof, when the computer system is powered on, the switching part connects the second communication line b to the fourth communication line d, thus allowing the ICH to communicate with at least one of the SATA HDD 30 mounted inside the computer system and the external SATA HDD of the external apparatus 200 connected to the computer system through the external connector 50. Specifically, the ICH may assign the separate SATA communication channels CH1 and CH2 to the SATA HDD 30 mounted inside the computer system and the external SATA HDD of the external apparatus 200, respectively, and access and communicate with one or both of the SATA HDD 30 mounted inside the computer system and the external SATA HDD of the external apparatus 200 when the computer system is powered on.

On the other hand, when the computer system is powered off, the method controlling the computer system according to aspects of this invention connects the third communication line 'c' to the fourth communication line 'd', thus allowing the SATA HDD 30 mounted in the internal connector 20 to communicate with the external apparatus 200 connected to the system through the external connector 50. Specifically, the SATA HDD 30 mounted in the internal connector 20 is accessed by the external apparatus 200 connected to the system through the external connector 50 without being accessed by the ICH, whose operation is stopped.

In this manner, the computer system according to aspects of the present invention can be connected to the external apparatus 200 by the external connector 50 and can access the external SATA HDD provided in the external apparatus 200. In addition, when the computer system is powered off, and accordingly, the SATA HDD mounted inside the system is not being used by the computer system, the external apparatus 200 connected to the system through the external connector 50 can access and use the SATA HDD mounted inside the system.

Thus, for a small computer system such as a notebook computer, other external electronic apparatuses are allowed to use an internal SATA HDD (or other device) of the system, which is otherwise not used when the system is powered off. In addition, the system can efficiently use the increased number of usable devices (for example, SATA HDDs) without restrictions on the size of the computer system.

As is apparent from the above description, the present invention provides a computer system with high use efficiency with an increased number of usable devices without spatial restrictions by allowing the computer system to access external devices or allowing the external devices to access an internal device mounted inside the computer system through an external mounting unit provided in the computer system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer system comprising:
   an internal mounting unit in which a device supporting a predetermined interface is mounted;
   an external mounting unit supporting the predetermined interface;
   a device controller comprising a plurality of communication channels, which can communicate with the device mounted in the internal mounting unit, to communicate with the device mounted in the internal mounting unit through a first communication channel of the plurality of communication channels and to communicate with an external apparatus mounted in the external mounting unit through a second communication channel of the plurality of communication channels; and
   a switching controller to selectively connect the external apparatus mounted in the external mounting unit to one of the second communication channel of the device controller and the device mounted in the internal mounting unit, depending on whether the computer system is powered on or off.

2. The computer system according to claim 1 wherein the switching controller comprises:
   a switching part to selectively connect the external apparatus mounted in the external mounting unit to one of the second communication channel of the device controller and the device mounted in the internal mounting unit; and
   a controlling part to detect the power-on/off of the computer system and to direct the switching part to connect the external apparatus to the device mounted in the internal mounting unit when the computer system is powered off and to connect the external apparatus to the second communication channel of the device controller when the computer system is powered on.

3. The computer system according to claim 2, further comprising a CPU controlling the power-on/off of the computer system,
   wherein the controlling part directs the switching part to connect the external apparatus to the second communication channel of the device controller when the controlling part receives a system power-on instruction from the CPU and directs the switching part to connect the external apparatus to the device mounted in the internal mounting part when the controlling part receives a system power-off instruction from the CPU.

4. The computer system according to claim 3, further comprising an ICH (input/output control hub) communicating with the CPU,
   wherein the ICH includes the controlling part.

5. The computer system according to claim 1, wherein the controlling part comprises a power supply to supply power when the computer system is powered on, and
   wherein the switching part connects the external apparatus to the second communication channel of the device controller when the switching part is supplied with power from the controlling part, and connects the external apparatus mounted in the external mounting unit to the device mounted in the internal mounting unit when the switching part is not supplied with power from the controlling part.

6. The computer system according to claim 5, wherein the predetermined interface supports a SATA (Serial Advanced Technology Attachment) standard.

7. The computer system according to claim 6, wherein the external apparatus comprises one of an external device supporting the SATA standard and an electronic apparatus equipped with the external device, and
   wherein both the device mounted in the internal mounting unit and the external device comprise a SATA HDD supporting the SATA standard.

8. The computer system according to claim 7, further comprising an ICH,
   wherein the ICH includes the device controller.

9. The computer system according to claim 8, wherein, when the computer system is powered on, the ICH communicates with at least one of the device mounted in the internal mounting unit and the external apparatus mounted in the external mounting unit through at least one of the first communication channel and the second communication channel.

10. The computer system according to claim 9, further comprising an internal battery to supply driving power to the device mounted in the internal mounting unit when the computer system is powered off.

11. The computer system according to claim 9, further comprising:
a power supply to supply circuit parts in the computer system with respective driving power; and
a communication port through which power is supplied from the outside,
wherein the power supply supplies the circuit parts in the computer system with the respective driving power when the computer system is powered on and supplies the driving power to the device mounted in the internal mounting unit using power supplied through the communication port when the computer system is powered off.

12. The computer system of claim 11, wherein the communication port is a USB port.

13. The computer system of claim 11, wherein the communication port is a Firewire port supporting the IEEE 1394 standard.

14. The computer system according to claim 1, further comprising a user input part,
wherein the controlling part comprises a microcomputer to direct the switching part to connect the external apparatus to the second communication channel of the device controller when the computer system is powered on through the user input part and to direct the switching part to connect the external apparatus to the device mounted in the internal mounting part when the computer system is powered off through the user input part.

15. The computer system according to claim 14, wherein the user input part comprises a switching function key to control the switching part; and
wherein the microcomputer, according to input from the switching function key of the user input part, directs the switching part to connect the external apparatus mounted in the external mounting unit to one of the second communication channel of the device controller and the device mounted in the internal mounting unit.

16. The computer system according to claim 1, wherein the external device is a computer system.

17. A computer system, comprising:
a device controller comprising a plurality of communication channels, wherein a first one of the communication channels communicates with a device mounted in an internal mounting unit, and wherein a second one of the communication channels communicates with an external apparatus mounted in an external mounting unit;
a switching controller comprising a switching part to selectively connect the external apparatus mounted in the external mounting unit to one of the second communication channel and the device mounted in the internal mounting unit and a controlling part to detect the power on/power off of the computer system, wherein the controlling part directs the switching part to connect the external apparatus to the device mounted in the internal mounting unit when the computer system is powered off and directs the switching part to connect the external apparatus to the second communication channel when the computer system is powered on; and
an internal power supply mounted in the computer system to supply power to the computer system while the computer system is powered on.

18. The computer system according to claim 17, further comprising a communication port through which power is supplied to the device mounted in the internal mounting unit while the computer system is powered off.

19. The computer system according to claim 18, wherein the communication port is a USB port.

20. The computer system according to claim 18, wherein the communication port is a Firewire port supporting the IEEE 1394 standard.

21. The computer system of claim 17, further comprising a battery mounted in the computer system to supply power to the device mounted in the computer system while the computer system is powered off.

22. A computer system, comprising:
a device controller comprising a plurality of communication channels, wherein a first one of the communication channels communicates with a device mounted in an internal mounting unit, and wherein a second on of the communication channels communicates with an external apparatus mounted in an external mounting unit;
a switching controller comprising a switching part to selectively connect the external apparatus mounted in the external mounting unit to one of the second communication channel and the device mounted in the internal mounting unit;
a microcomputer to direct, based upon the receipt of a first signal, the switching part to connect the external apparatus to the device mounted in the internal mounting unit and, based upon the receipt of a second signal, to direct the switching part to connect the external apparatus to the second communication channel; and
a user input part to transmit the first and second signals to the microcomputer based upon user input.

23. The computer system according to claim 22, wherein the first signal is a computer system power off signal.

24. The computer system according to claim 22, wherein the second signal is a computer system power on signal.

25. A computer system, comprising:
a device controller comprising a plurality of communication channels, wherein a first one of the communication channels communicates with a device mounted in an internal mounting unit, and wherein a second one of the communication channels communicates with an external apparatus mounted in an external mounting unit;
a switching controller comprising a switching part and a controlling part;
a CPU mounted in the computer system to transmit a power-on signal and a power-off signal to the switching controller; and
wherein the switching part selectively connects the external apparatus mounted in the external mounting unit to one of the second communication channel and the device mounted in the internal mounting unit and a controlling part to detect the power on/power off of the computer system and wherein the controlling part directs the switching part to connect the external apparatus to the device mounted in the internal mounting unit when the switching controller receives the power-off signal and directs the switching part to connect the external apparatus to the second communication channel when the switching controller receives the power-on signal.

26. The computer system according to claim 25, wherein the external device is a computer system.

27. A computer system, comprising:
a switching part to switch to a first connection or to a second connection, wherein the first connection connects an external device mounted to an external mounting unit to an internal device mounted to an internal mounting unit, and wherein the second connection connects the external mounting unit to a control hub mounted in the computer system.

28. The computer system according to claim 27, further comprising an internal power supply to supply power to the computer system while the computer system is turned on.

29. The computer system according to claim 27, further comprising a communication port to supply power to the internal device while the computer system is turned off.

30. The computer system according to claim 27, wherein the switching part switches to the first connection upon receiving a first signal.

31. The computer system according to claim 30, wherein the first signal is a signal to power off the computer system.

32. The computer system according to claim 27, wherein the switching part switches to the second connection upon receiving a second signal.

33. The computer system according to claim 32, wherein the second signal is a signal to power on the computer system.

* * * * *